UNITED STATES PATENT OFFICE.

MATHIAS HAUBER, JR., OF WEST HAVERSTRAW, NEW YORK.

RECOVERY OF POTASSIUM AND ALUMINIUM COMPOUNDS.

1,323,764. Specification of Letters Patent. Patented Dec. 2, 1919.

No Drawing. Application filed July 15, 1919. Serial No. 311,024.

*To all whom it may concern:*

Be it known that I, MATHIAS HAUBER, Jr., a citizen of the United States, residing at West Haverstraw, in the county of Rockland, in the State of New York, have invented new and useful Improvements in the Recovery of Potassium and Aluminium Compounds, of which the following is a specification.

This invention relates to a process of recovering the sulfates of potassium and aluminium, either as mixtures of these in various proportions or in combination as potash alum. It refers more particularly to the treatment of glauconite which occurs in extensive deposits and is commonly known as greensand, but may be applied to any suitable material containing these elements. The object of this process is to provide a method that will be simple in its nature, comparatively easy to carry out, and less costly to operate than those heretofore proposed.

With these and other objects in view the invention consists in the novel steps and combination of steps as will be more fully hereinafter disclosed and particularly pointed out in the claims.

In operating this process greensand either ground or unground may be intimately mixed with ferrous sulfate, known usually to the trade as copperas or green vitriol, and the whole raised to a temperature sufficient to bring about the reaction.

As an example of the process, unground greensand is mixed with a concentrated solution of ferrous sulfate in such proportion that there shall be 30 parts of ferrous sulfate for every 100 parts of greensand employed. The strength of the solution is immaterial provided there is enough ferrous sulfate present, and the volume of the liquid is sufficient to uniformly moisten the mass. By experience I have found that a solution of 50% strength is very suitable, as it affords sufficient liquid to moisten the required amount of greensand without undue wetting, which would necessitate a certain amount of evaporation. The temperature to which the mass is heated may vary from 300 to 800° C. but for general purposes under normal conditions 450° C. is very suitable. The duration of the heating varies with the fineness and the nature of the greensand, but for example it may extend from one-half hour to two hours, and one hour is a very satisfactory length of time.

After the greensand has been mixed to a thick paste with the concentrated ferrous sulfate solution it is at once fed to the furnace and heated to a temperature sufficient to decompose all the ferrous sulfate but below that at which aluminium sulfate would begin to decompose.

It is also essential that the temperature be held down below the point at which sintering or partial fusion sets in.

Any of the various types of furnaces may be employed, such as for example: rotary kilns, wedge roasters Herreshoff's or other well known calcining furnaces. On leaving the furnace the material may be dumped directly into water and progressively leached. On evaporation potash alum crystallizes out in a comparatively pure condition.

In adding an iron salt as is done in this process, the amount of iron present in the mixture is very much greater than that in the original greensand. On further treating so that all the potassium and aluminium is removed as well as the adhering moisture and water of combination, the resulting residue may almost be classed as an iron ore so great has been the percentage increase of iron. It has already been suggested that greensand itself might be classed and employed as a source of iron, but little or no progress has previously been made in this direction owing to the low iron content. By this process the deficiency is overcome. Another advantage in utilizing this residue is its great freedom from objectionable impurities.

If properly proportioned the sulfates will be entirely removed by the complete decomposition of the added ferrous sulfate and the leaching out of all the soluble potassium and aluminium sulfates.

Another and perhaps better use of my residue consists in applying it as a pigment in paints, plastics, composite brick, cements, mortars, etc. It is of a very pleasing brick red color, and possessing great coloring power. In the case of paints its covering power is very marked. The residue may also be employed as an abrasive.

It is obvious that those skilled in the art may vary the details of the process as well as the nature of the product without departing from the spirit of the invention, and therefore, I do not wish to be limited to the above disclosures except as may be required by the claims.

I claim:

1. A process of recovering potassium and aluminium from greensand, which comprises heating the material intimately mixed with ferrous sulfate at a dull red heat, thereby decomposing the ferrous sulfate and forming combined sulfates of potassium and aluminium; substantially as described.

2. A process of recovering potassium and aluminium from greensand, which comprises heating the material intimately mixed with ferrous sulfate to such a temperature and for such a length of time that the ferrous sulfate shall be decomposed and a major portion of the potassium and aluminium will be converted into sulfates; substantially as described.

3. A process of recovering potassium and aluminium from greensand, which comprises saturating the unground greensand with a solution of ferrous sulfate, heating the mass to a dull red heat for a period of from one half to two hours, extracting the mass with water and crystallizing the dissolved potash alum; substantially as described.

4. A process of recovering the potassium and aluminium content of greensand, which comprises intimately mixing 100 parts of greensand and 30 parts of ferrous sulfate, heating the mass from 300° C. to 800° C. for one hour and dissolving out the resulting alum; substantially as described.

MATHIAS HAUBER, Jr.